Figure 1:
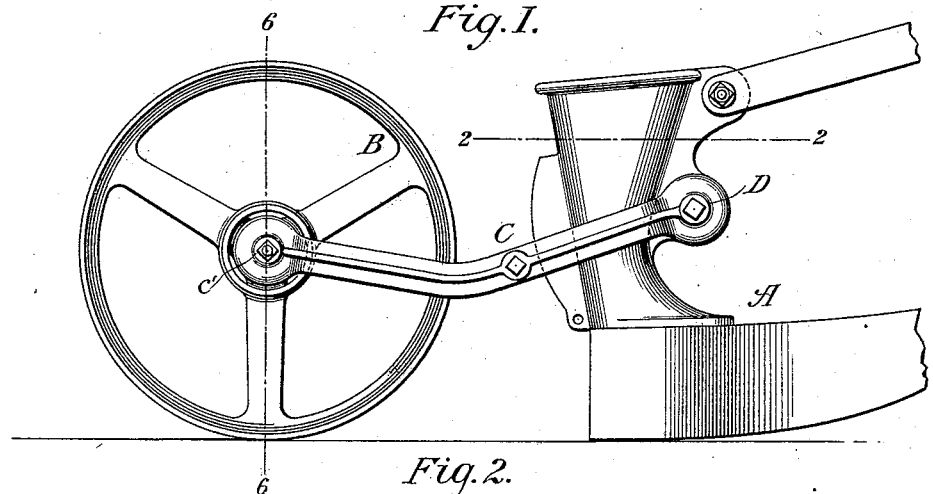

(No Model.)

G. W. KIRKPATRICK.
SEEDING MACHINE.

No. 472,891. Patented Apr. 12, 1892.

sec. on line 2-2.

sec. on line 6-6.

Witnesses
Raymond F. Barnes.
William H. Shipley.

Inventor
G. W. Kirkpatrick
By P. T. Dodge
Attorney ically for many years past grain-drills having drill-teeth or hoes to open the furrows have been provided with small wheels following one behind each wheel to roll down the earth and assist in closing the furrow over the seed.

UNITED STATES PATENT OFFICE.

GEORGE W. KIRKPATRICK, OF MACEDON, NEW YORK.

SEEDING-MACHINE.

SPECIFICATION forming part of Letters Patent No. 472,891, dated April 12, 1892.

Application filed August 26, 1891. Serial No. 403,802. (No model.)

*To all whom it may concern:*

Be it known that I, GEORGE W. KIRKPATRICK, of Macedon, county of Wayne, and State of New York, have invented a new and useful Improvement in Seeding-Machines, of which the following is a specification.

For many years past grain-drills having drill-teeth or hoes to open the furrows have been provided with small wheels following one behind each wheel to roll down the earth and assist in closing the furrow over the seed. In all machines of which I am aware these wheels have been mounted in the forked end of a carrying-arm or between two connected arms and have been made, as was thought necessary, with five or more spokes. As thus constructed and mounted the wheels have been the source of great trouble and loss of time and have been very imperfect in their action by reason of the accumulation of clods, stalks, grass, and other obstructions between them and their carrying-arms, so that their rotation was prevented. Many contrivances to overcome the trouble have been resorted to without success.

Now, the first part of my invention is intended to prevent the lodgment of foreign matters in or upon the wheel. The invention is based upon the discovery made by me after long study and experiment that the lodgment of material in and its elevation and accumulation by wheels of the ordinary construction is due to the shape and size of the opening between the spokes. If the wheel has four, five, or six spokes, as usual, they stand at such angles to each other and the distance between their outer ends in relation to the distance between the rim and hub is such that clods or other bodies rolling into the lower part of the wheel from the side are caused as the wheel rises at the rear to slide inward and wedge fast between the spokes, so that they are carried up and lodge upon the wheel-carrying arms. Now, I have discovered that if the wheel be made with three equidistant spokes only or with two spokes only in a diametric line the intervening openings will be of such form and of such relative dimensions that foreign matters rolling therein will fall out again as the wheel turns instead of wedging fast.

A long and thorough test of wheels thus constructed establishes the fact that the simple change which I have made is an efficient remedy for the ordinary troubles and that wheels on my plan will run under all ordinary conditions without stoppage and free from accumulations thereon.

I commonly construct my wheel by casting it complete in one piece, as I find that, contrary to the expressed opinion and belief of those skilled in the art of metal founding, they can be thus cast without destruction by unequal shrinkage.

The second part of my invention is intended to prevent sand and other foreign matters from entering the journal-bearing of the wheel; and it consists, essentially, in providing the wheel with an annular guard or band, which overhangs the bearings on both sides, so as to protect them from matters falling from above.

Figure 2:
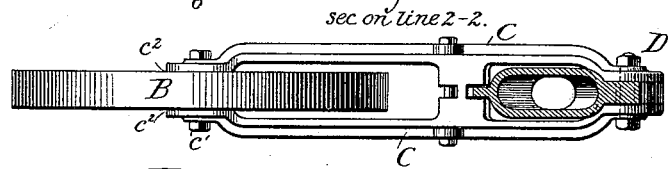
Figure 3:
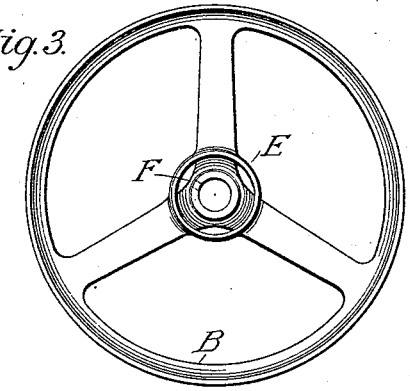
Figure 4:
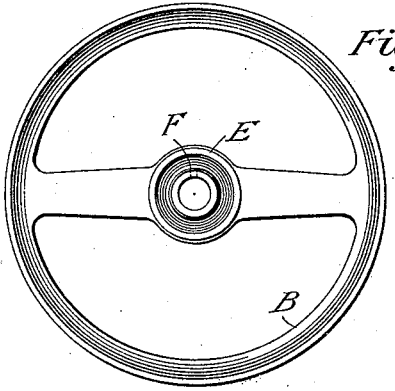
Figure 5:
Figure 6:
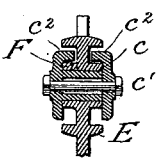

In the accompanying drawings, Figure 1 is a side view of a runner-hoe and its follower-wheel constructed in accordance with my invention. Fig. 2 is a horizontal section on the line 2 2 of Fig. 1, looking in a downward direction. Figs. 3 and 4 are side views of my wheel in different forms. Fig. 5 is an inside face view of one of the carrying-arms. Fig. 6 is a cross-section on the line 6 6 of Figs. 1 and 2.

Referring to the drawings, A represents the runner-hoe, which may be of any ordinary or approved construction; B, the follower-wheel, arranged to travel directly behind the hoe, and C the wheel-carrying arm, consisting in the present instance of two longitudinal complementary parts bolted together at the middle and separated at the ends, so that they may straddle or embrace the hoe and the wheel. At their forward ends they are connected to the hoe by the horizontal pivot D, so that they may swing vertically, so as to allow the hoe and the wheel to rise and fall independently. The wheel consists of a hub, a circular rim, and intermediate rigid spokes; but the spokes, instead of standing at an angle of ninety degrees or less to each other, as usual, are reduced in number to three and arranged at an angle of one hundred and twenty degrees, as in Fig. 3, or in some cases reduced to two and arranged in diametrically opposite positions, as shown. In each case the angle and the distance between the spokes is much greater than in wheels heretofore used and the spaces much wider in a circumferential than in a radial direction.

As a means of carrying the wheel I provide one of the arms with a journal $c$, which extends through the hub of the wheel and into a seat in the opposite arm, with which it is connected by a through-bolt $c'$.

The entrance of dust and sand to the wearing-surfaces is prevented in part by flanges $c^2$, formed on the arms and overhanging the ends of the hub, but is prevented, mainly, by an annular band or flange E, secured to or formed on the wheel so as to encircle and overhang the flanges $c^2$ and the ends of the hub. The flange E, rolling with the wheel, serves to arrest and discharge all matters falling from the rim above.

The wheel is provided with an oil-hole F, leading through the middle of the hub to the journal therein. The flange E serves, also, to prevent the access of sand to this hole.

Having thus described my invention, what I claim is—

1. In a grain-drill, a hoe, in combination with an arm extending rearward therefrom and a follower-wheel mounted within said arm, said wheel having three spokes or less, as distinguished from wheels having four or more spokes, whereby the openings between the spokes are given such size and shape as to prevent the lodgment of obstructive matters therein.

2. In a grain-drill, a hoe, a vertically-swinging wheel-carrying arm extending rearward from the hoe, and a follower-wheel carried by the rear end of said arm, said wheel having three spokes only or less, as distinguished from wheels having four or more spokes, thus giving an angular space of one hundred and twenty degrees or more between its spokes.

3. In combination with the wheel having the hub and the annular flange or guard encircling the same, the carrying-arm having flanges $c^2$, overlapping the ends of the hub within the annular flange.

4. The wheel provided with the hub, the oil-opening through the hub, and the annular flange or guard surrounding the hub to prevent foreign matters from falling into the oil-opening.

In testimony whereof I hereunto set my hand, this 17th day of July, 1891, in the presence of two attesting witnesses.

GEORGE W. KIRKPATRICK.

Witnesses:
  JOE L. THISTLETHWAITE,
  GEORGE W. STEVENS.